G. E. & E. B. ROEDDING.
SIGNAL LAMP.
APPLICATION FILED DEC. 21, 1914.
1,248,719.
Patented Dec. 4, 1917.
3 SHEETS—SHEET 1.
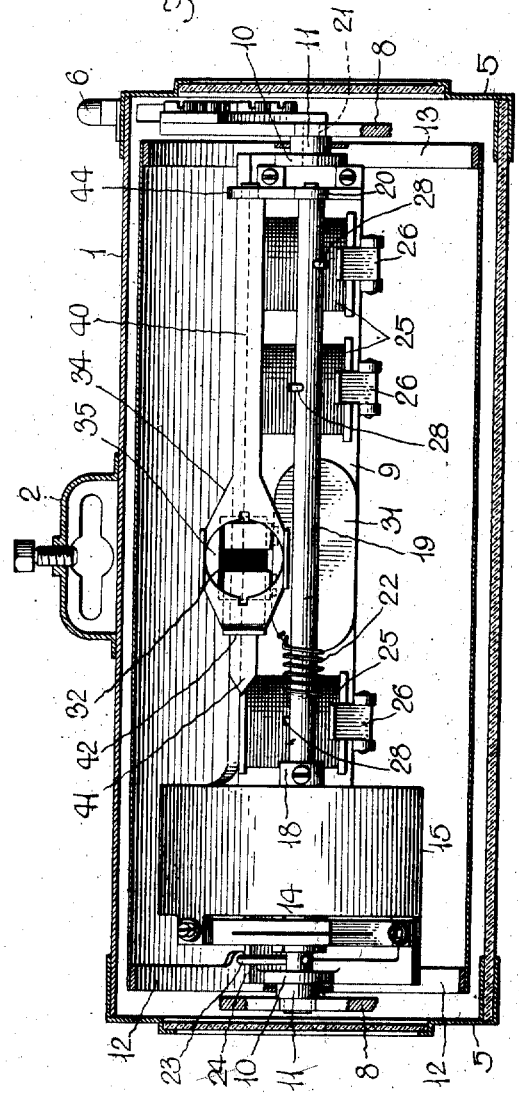
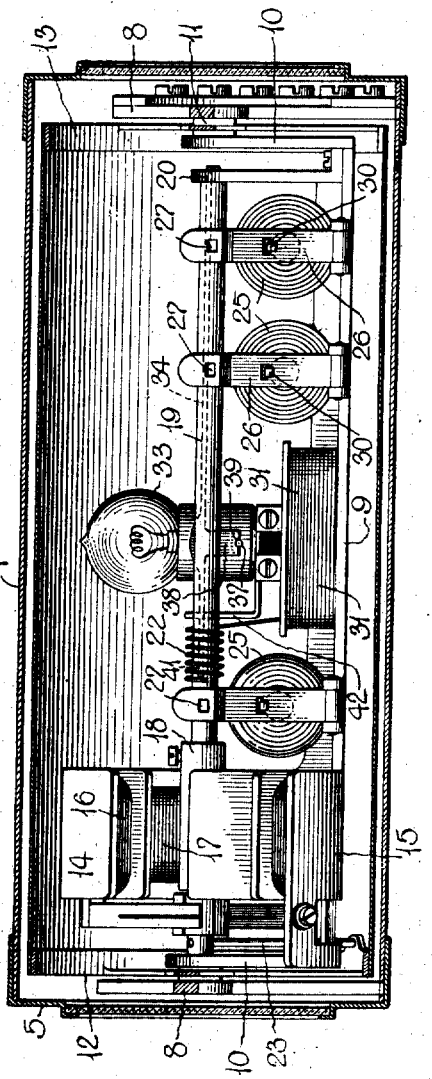
Witnesses
Chas. W. Stauffer
Anna M. Dorr
Inventor
Gordon E. Roedding,
Edward B. Roedding,

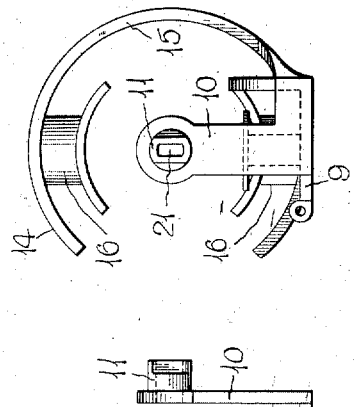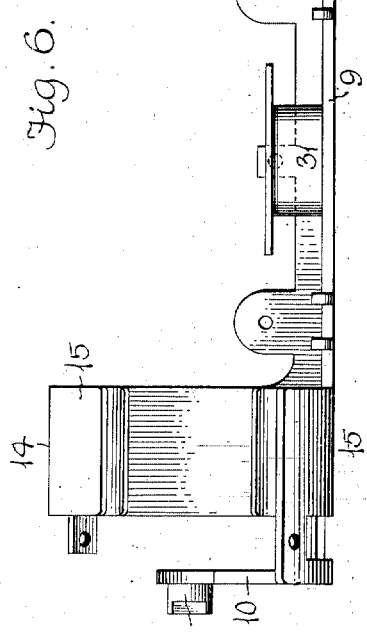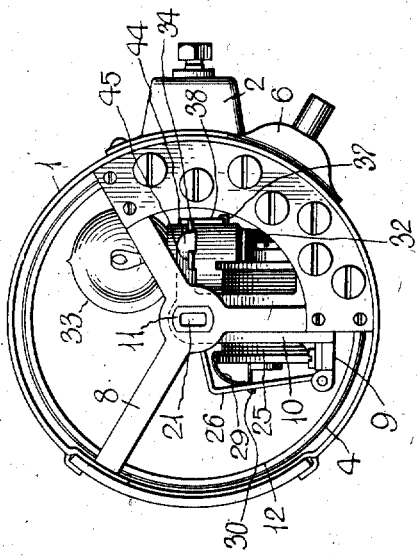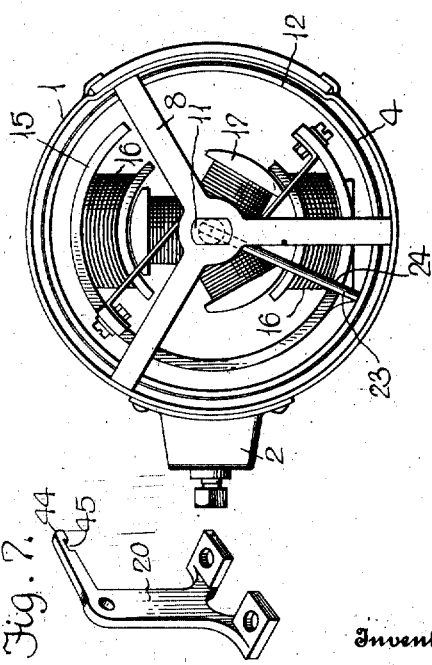

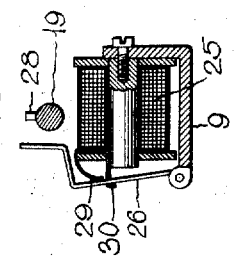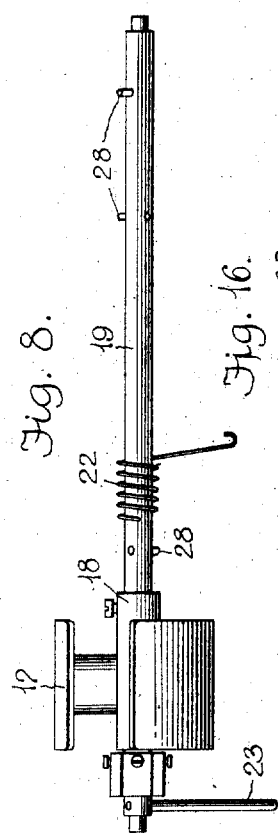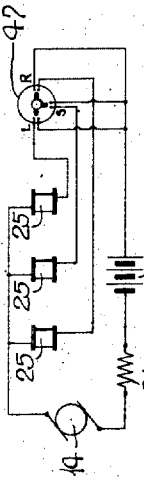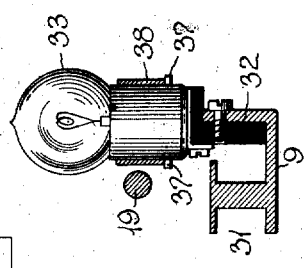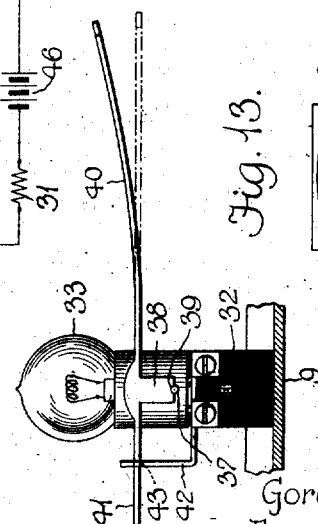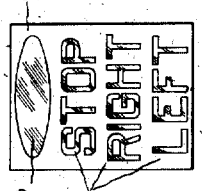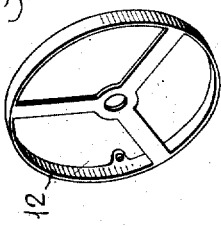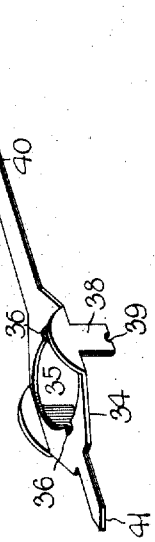

UNITED STATES PATENT OFFICE.

GORDON E. ROEDDING AND EDWARD B. ROEDDING, OF DETROIT, MICHIGAN.

SIGNAL-LAMP.

1,248,719.     Specification of Letters Patent.     Patented Dec. 4, 1917.

Application filed December 21, 1914. Serial No. 878,254.

*To all whom it may concern:*

Be it known that we, GORDON E. ROEDDING and EDWARD B. ROEDDING, citizens of the United States of America, residing at Detroit, in the county of Wayne and State of Michigan, have invented certain new and useful Improvements in Signal-Lamps, of which the following is a specification, reference being had therein to the accompanying drawings.

This invention relates to signal devices particularly adapted for use upon motor vehicles to indicate the intentions of the driver to those following, and its object is to provide a simple, compact and efficient electrically operated device for the purpose of having certain new and useful features in the construction and arrangement of parts, all as hereinafter more fully described and particularly pointed out in the appended claims, reference being had to the accompanying drawings in which Figure 1 is a longitudinal horizontal section through a device embodying the invention;

Fig. 2 is a longitudinal vertical section through the same;

Figs. 3 and 4 are left and right hand end elevations respectively of the same with the casing end caps removed;

Fig. 5 is an end elevation of a supporting frame;

Fig. 6 is a side elevation of the same;

Fig. 7 is a perspective view of a bearing bracket;

Fig. 8 is a side elevation of a motor armature and shaft upon which it is mounted;

Fig. 9 is a detail showing in side elevation a lamp bracket and means for securing the lamp in place thereon;

Fig. 10 is a transverse sectional detail of the same;

Fig. 11 is a perspective detail of a lamp fastener;

Fig. 12 is a sectional detail of an electromagnetic stopping device;

Fig. 13 is a detail development of a rotatable indicating cylinder;

Fig. 14 is a perspetcive detail of a spider for one end of said cylinder;

Fig. 15 is a perspective view of the complete device; and

Fig. 16 is a wiring diagram

In the drawings, 1 indicates a suitable casing which is preferably cylindrical in form and is provided at one side with suitable means such as a clip 2 for rigidly securing the casing to any suitable supporting bracket, and at its opposite side said casing is formed with an opening closed by glass or other transparency to form a window through which a series of words or other signal markings 3 may be seen upon a rotatable drum 4. The ends of the casing are closed caps 5 each provided with a bull's-eye, the cap which is adjacent the cable outlet 6 on the casing being preferably made readily detachable so that access may be had to the interior of the casing by removing it.

The several indicating words 3, such as "stop", "right" and "left" on the drum 4 are preferably made transparent so that they may be illuminated by a light within the casing and a portion indicated at 7 is colored to provide a ruby light serving the purpose of the tail lamp usually provided upon vehicles. The letters of the several words are preferably white in color and the body or background is preferably black and opaque so that the words may be clearly distinguished in the day time and the letters and ruby portion only will be illuminated at night.

Rigidly secured within each end of the casing 1 is a spider 8 and these spiders form rigid supports for a fixed supporting frame 9 having arms forming hangers 10 each provided with an outwardly extending stud 11 to engage an opening in each spider at the longitudinal axis of the casing 1 and drum or cylinder 4. The openings in the spider are elongated and the studs on the frame are formed to fit within said openings and thus rigidly support the frame against turning within the drum and casing. Each stud 11 is also formed adjacent its hanger 10 to provide a trunnion bearing upon which end spiders 12 and 13, rigidly secured in the ends of the drum 4, are mounted to turn freely. The supporting frame 9 is thus rigidly supported within the drum 4 which is free to rotate about it upon an axis coincident with the axis of the casing.

The portion of the frame 9 which is between the hangers 10, extends longitudinally of the drum adjacent the lower side thereof and forms a bed plate upon which is mounted a suitable electric motor 14 comprising a supporting ring 15 for the field coils 16, which ring may be an integral part of the frame as shown or may be secured thereto in any suitable manner, and an armature 17 is preferably formed with a hollow or tubular armature shaft 18 to receive a shaft 19 which forms a support for the armature and is connected thereto to turn therewith. The shaft 19 has a bearing at one end in the stud 11 at one end of the frame 9 and at its opposite end is supported by a bearing bracket 20 on the bed of the frame adjacent the other end of the frame, the supporting stud 11 of which is formed hollow, as at 21 to permit the electric wires (not shown) leading to the motor and other devices hereinafter to be described as carried by the frame, to pass out of the revoluble drum 4 at the axis thereof without interfering with the turning of the drum.

When current is passed through the motor, its armature and the shaft 19 upon which it is secured will be turned in one direction, and to turn the shaft in an opposite direction or back to normal position after being turned by the motor, a coiled spring 22 is sleeved upon the shaft with one end secured thereto and its opposite end anchored to any convenient stationary part. An arm 23 on the shaft extends laterally therefrom and is made fast at its outer end to the spider 12 of the drum 4 so that when the shaft is turned, the drum will turn with it, and this arm normally engages a projection or side of the bed of the frame 9 which forms a stop 24 to limit the turning movement of the shaft in one direction, the spring 22 normally holding the shaft turned with said arm against said stop and in which position of the drum, its red transparent part 7 is opposite the window in the front of the casing.

In order to stop the drum 4 when rotated by the motor, with any desired signal word opposite the window and thus indicate the intention of the driver of the vehicle to those following, a series of electrically operated stop devices, corresponding in number to the number of signal words on the drum, are provided, each device comprising an electro-magnet 25 mounted upon the bed 9 transversely thereof beneath the shaft 19 and provided with an armature bar 26 which is pivoted at one end to the base and extends upward past the end of the magnetic coil with its upper end adjacent the shaft. Each bar 26 has an opening 27 opposite the shaft to be engaged by a pin 28 projecting laterally from the shaft. Each of these pins is so set relative to its corresponding word 3 on the drum 4, that when the drum is stopped in its rotation by the engagement of a pin with an opening in the opposed armature, its corresponding signal word will be displayed through the window of the casing. The several armatures 26 are normally held by springs 29 (see Fig. 12) turned upon their pivots out of the path of travel of the pins, stops 30 being provided to limit the swing of said armatures away from their magnets, but when a current is passed through a coil, its armature will be swung against the action of its spring 29 toward the shaft to a position where the corresponding stop pin on the shaft will engage the opening in the armature bar and positively stop the shaft from further turning in that direction. As long as said electro-magnet is energized, the drum will be positively held in the position to which it is turned, but upon breaking of the electric circuit of the magnet, said magnet will be deënergized and the spring 29 will act to throw the armature out of engagement with the pin and permit the spring 22 to turn the shaft back to normal position with the red signal transparency of the drum opposite the casing window.

If found desirable, a persistance coil 31 may also be mounted upon the bed 9, this coil being connected in series with the motor to prevent the burning out of the motor due to excessive voltage, and a suitable insulated mounting or seat 32 for a lamp 33 is also preferably provided on the bed intermediate its ends. In order that the lamp may be readily inserted or removed and may be firmly held to its seat when in place thereon to make electrical connection between its contacts and contacts provided on said seat, a holder 34 (see Fig. 11) is provided comprising a member formed of sheet metal with an opening 35 therein to receive the base of the lamp, said opening having notches 36 to permit the passage therethrough of pins 37 on the lamp base. A portion of the metal from the opening 35 is struck downward to form arms, 38, each of which has a notch 39 in its lower end to be engaged by the pins 37 after the lamp base has been inserted and turned to bring said pins into engagement with the arms. The lamp will thus be detachably held by the holder so that the operator, by grasping an extended handle portion 40, may insert the lamp through the spiders 8 and 13 after removing the detachable end cap from the casing and place the lamp upon its seat. To hold the lamp in place with a strong spring pressure which will insure a good contact, the holder is formed with a prong or bayonet 41 extending in a direction opposite to that of the handle 40, and an arm 42 on the mounting 32 is provided with an opening 43 (see Fig. 9) to receive the bayonet. A laterally extending arm 44 (see Fig. 7) is provided on the bearing bracket 20, and after the bayonet end of the holder has been inserted in the opening of the arm 42, the handle is pressed downward and its end engaged beneath the arm in a notch 45 therein. The flexure of the holder thus holds the lamp firmly and yieldingly in engagement with the contacts on its seat and it serves as a tool by means of which the lamp may be quickly inserted in the casing through the limited openings between the arms of the spiders.

In the diagram shown in Fig. 16, the several electro-magnets 25 are connected in multiple with the motor and each circuit, within which is included a battery indicated at 46 and the resistance coil 31, is controlled by a suitable switch which may be a single device as indicated at 47 having a pair of contacts for each circuit, which contacts may be brought into electrical connection in any suitable manner to close their circuit. When the driver desires to make it known that he intends to turn to the right, to the left, or to stop, he will, by means of the switch indicated at 47, close the circuit of the particular electro-magnet which is arranged to stop the drum in a portion to display the desired word, and the closing of the circuit simultaneously energizes the motor to turn the shaft and drum. The driver may thus signal his intentions to others by simply operating a button which may be placed upon the steering wheel, or in any other convenient place upon the vehicle, and it is obvious that the device may be provided with other indicating words or signs to be displayed in a like manner. A separate circuit (not shown) is provided for the lamp 33 in the usual manner so that it may be turned on or off as desired, and this device by reason of the arrangement of the lamp within its casing and the ruby portion of the drum which is normally opposite the window, serves the purpose of a tail lamp as well as a signal device. The particular arrangement of the motor directly connected to the drum shaft, simplifies and greatly cheapens the construction, and the arrangement of the stop devices to act directly upon the shaft also simplifies construction and makes the same positive and efficient in its operation.

Obviously changes may be made in the construction and arrangement of parts without departing from the spirit of our invention and we do not therefore limit ourselves to the particular form or arrangement shown.

What we claim is:—

1. In a signal device, the combination of a casing, a rotatable drum in the casing, a shaft in the axis of the drum, a fixed support extending through the drum at one side of the shaft, an electric motor comprising a field carried by the support and an armature on the shaft to rotate the drum, a series of stops on the shaft, and a series of electrically operated devices on the support arranged along the shaft within the drum to engage the stops.

2. In a signal device of the character described, the combination of a fixed cylindrical casing, a rotatable drum within the casing, a shaft in the axis of the drum for turning the same, supports in the ends of the casing for the shaft and drum, a fixed supporting member carried by the supports and extending longitudinally the length of the drum at one side of the shaft, an electric motor comprising field coils carried by the supporting member and an armature fixed on the shaft, a lamp bracket on the supporting member intermediate the ends of the drum, a series of stops on the shaft, a series of electromagnets on the supporting member arranged transversely of the shaft, a series of members pivotally connected to the supporting member and operated by said electromagnets to engage the stops on the shaft, and means insertible through the ends of the casing for securing the lamp upon the lamp bracket.

3. In a signal device of the character described, the combination of a casing having an opening, a rotatable drum in the casing having indicating markings, means for rotating the drum, a fixed support in the drum, a lamp bracket on the support, and means for detachably securing a lamp upon the bracket comprising a holder for the lamp having an extended handle portion by means of which the lamp may be inserted through the end of the casing, said holder being also provided with means for detachably connecting the holder to the bracket.

4. In a signal device of the character described, the combination of a casing having an opening, a rotatable drum in the casing having a series of indicating markings, a fixed support within the drum, a lamp bracket on the support provided with contacts and forming a seat for a lamp, a lamp holder having an opening to receive a lamp and provided with an extended yieldable handle portion, and means for engaging the holder and its handle portion to yieldingly hold a lamp to its seat on the bracket.

5. In a signal device of the character described, the combination of a casing having an opening, a rotatable drum in the casing having a series of indicating markings, a fixed support within the drum, a lamp bracket upon the support, a lamp holder formed of sheet metal with an opening to receive a lamp and an extended yieldable handle portion, means on the bracket to engage the holder at one side of the lamp, and means on the support to engage the handle portion near its free end at the opposite side of the lamp, whereby the lamp is held in yielding contact with its seat on the bracket.

6. In a signal device of the character described, the combination of a casing having an opening, a rotatable drum in the casing, a supporting spider on each end of the casing having an opening at the axis of the casing, a frame having trunnions to engage the openings, spiders for the ends of the drum rotatable upon said trunnions, a motor within the drum for turning the same, a lamp bracket on the frame within the drum intermediate the ends thereof, and a lamp holder having an opening to receive a lamp and provided with an extended yieldable handle portion adapted to extend to near one end of the drum when the holder is in operative position.

7. In a device of the character described, the combination of a casing having an entrance opening giving access to the interior thereof, signaling means within the casing, means within the casing for operating the signaling means, a lamp bracket within the casing at a distance from said entrance opening, and means for detachably securing a lamp upon said bracket comprising a holder for the lamp having a portion adapted to extend from the bracket to a point adjacent the entrance opening when the holder is in operative position and by means of which portion the lamp may be inserted through the entrance opening.

In testimony whereof we affix our signatures in presence of two witnesses.

GORDON E. ROEDDING.
EDWARD B. ROEDDING.

Witnesses:
LEWIS E. FLANDERS,
ANNA M. DORR.